(12) United States Patent
Park et al.

(10) Patent No.: US 9,183,774 B2
(45) Date of Patent: Nov. 10, 2015

(54) DISPLAY APPARATUS AND DRIVING METHOD THEREOF FOR ENHANCING IMAGE QUALITY USING AN ENCODER AND A DECODER

(75) Inventors: Jong-Woong Park, Yongin (KR); Yong-Seok Choi, Yongin (KR); Byung-Hyun Kim, Yongin (KR); Geun-Young Jeong, Yongin (KR); Ju-Hyung Lee, Yongin (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 561 days.

(21) Appl. No.: 13/477,974

(22) Filed: May 22, 2012

(65) Prior Publication Data

US 2013/0208016 A1   Aug. 15, 2013

(30) Foreign Application Priority Data

Feb. 14, 2012   (KR) .................. 10-2012-0014881

(51) Int. Cl.
  *G09G 3/20*   (2006.01)
  *G09G 5/04*   (2006.01)
  *H04N 5/70*   (2006.01)

(52) U.S. Cl.
  CPC ............... *G09G 3/2096* (2013.01); *G09G 5/04* (2013.01); *G09G 2320/10* (2013.01); *G09G 2340/02* (2013.01); *H04N 5/70* (2013.01)

(58) Field of Classification Search
  CPC ........... G09G 5/10; G09G 5/39–5/399; G09G 2352/00; G09G 2310/0224–2310/0229; G09G 2310/0286; G09G 2310/0297; G09G 2320/02; G09G 2320/0204; G09G 2320/0233–2320/0252; G09G 2320/04–2320/048; G09G 2340/10–2340/16; H04N 7/50; H04N 7/26244; H04N 7/26313; H04N 7/30; H04N 7/26335
  USPC ............ 345/690–697, 76, 77, 82, 83, 87–89, 345/98–100; 382/232–234, 236, 237, 239, 382/244–247
  See application file for complete search history.

(56) References Cited

U.S. PATENT DOCUMENTS

2006/0147120 A1 *   7/2006   Kuo .............................. 382/232
2012/0068999 A1 *   3/2012   Yoo et al. ...................... 345/419

FOREIGN PATENT DOCUMENTS

| KR | 10-0182181 B1 | 12/1998 |
| KR | 10-2008-0025048 (A) | 3/2008 |
| KR | 10-2009-0016212 (A) | 2/2009 |

* cited by examiner

*Primary Examiner* — Nathan Danielsen
(74) *Attorney, Agent, or Firm* — Knobbe Martens Olson & Bear LLP

(57) ABSTRACT

A display apparatus is disclosed. In one aspect the apparatus includes an encoder configured to encode a Nth first image data, where N is an integer of 2 or greater and a (N−1)th second image data at different rates. The display further includes a memory configured to store the encoded Nth first image data and the encoded (N−1)th second image data, a decoder configured to decode the encoded Nth first image data and the encoded (N−1)th second image data received from the memory and, an image processor configured to perform color processing on the decoded Nth first image data. It also includes an image converter configured to convert the Nth first image data received from the image processor into Nth second image data and an image quality enhancer configured to enhance image quality of the Nth second image data based on the decoded (N−1)th second image data.

25 Claims, 8 Drawing Sheets

R1 (8bit) + R2 (8bit) → R12 (12bit)
B1 (8bit) + B2 (8bit) → B12 (12bit)
G1 (8bit) + G2 (8bit) → G12 (12bit)
G3 (8bit) + G4 (8bit) → G34 (12bit)

FIG. 6
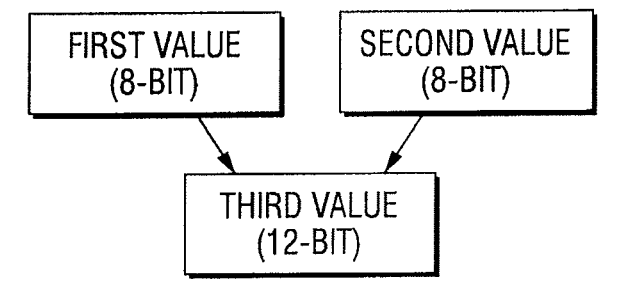
· THIRD VALUE
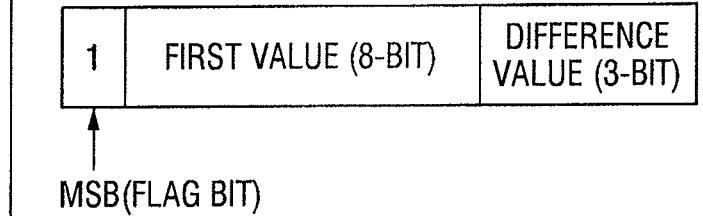
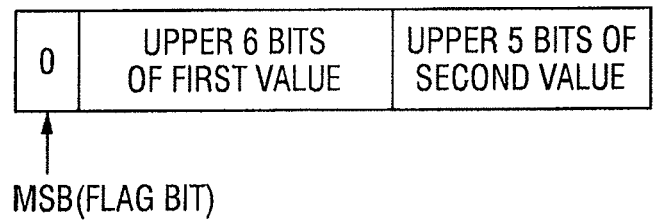

Y(a, 2b-1)={R1, B1, G1, G2}
Y(a, 2b)={R2, B2, G3, G4}

R1 (8bit) + R2 (8bit) → R12 (12bit)
B1 (8bit) + B2 (8bit) → B12 (12bit)
G1 (8bit) + G2 (8bit) → G12 (12bit)
G3 (8bit) + G4 (8bit) → G34 (12bit)

Y(2i-1, j)={R1, B1, G1, W1}
Y(2i, j)={R2, G2, B2, W2}

R1 (8bit) + R2 (8bit) → R12 (12bit)
B1 (8bit) + B2 (8bit) → B12 (12bit)
G1 (8bit) + G2 (8bit) → G12 (12bit)
W1 (8bit) + W2 (8bit) → W12 (12bit)

Y(a, 2b-1)={R1, G1, B1, W1}
Y(a, 2b)={R2, G2, B2, W2}

R1 (8bit) + R2 (8bit) → R12 (12bit)
B1 (8bit) + B2 (8bit) → B12 (12bit)
G1 (8bit) + G2 (8bit) → G12 (12bit)
W1 (8bit) + W2 (8bit) → W12 (12bit)

DISPLAY APPARATUS AND DRIVING METHOD THEREOF FOR ENHANCING IMAGE QUALITY USING AN ENCODER AND A DECODER

CROSS-REFERENCE TO RELATED APPLICATIONS

This application claims priority from Korean Patent Application No. 10-2012-0014881 filed on Feb. 14, 2012 in the Korean Intellectual Property Office, the disclosure of which is incorporated herein by reference in its entirety.

BACKGROUND

1. Field

The disclosed technology relates to a display apparatus and a driving method thereof, and more particularly, to a display apparatus for driving image quality compensation without functional damages and a driving method thereof.

2. Description of the Related Technology

There are various methods for enhancing image quality of motion pictures in a display apparatus. Specifically, when overdriving technology is employed, image data for a present frame and image data for a previous frame are required. Therefore, in order to enhance image quality, memory is used to store image data from the present frame and image data from the previous frame.

However, if an initially input image data size and an image data size displayed on an actual display panel are different from one another, it is not possible to employ the same compression method on the image data from the present frame and the image data from the previous frame.

SUMMARY OF CERTAIN INVENTIVE ASPECTS

Accordingly, aspects of this disclosure describe a display apparatus to display an image, wherein the image quality for a current frame is enhanced based on image data from a previous frame.

According to one aspect, an encoder encodes Nth first image data and (N−1)th second image data at different rates, wherein N is an integer greater than or equal to 2. A memory stores the encoded Nth first image data and the encoded (N−1)th second image data, and a decoder decodes the encoded Nth first image data and the encoded (N−1)th second image data stored in the memory. An image processor may perform color processing on the decoded Nth first image data, which may be converted into Nth second image data by an image converter. An image quality enhancer may then enhance the quality of the Nth second image data based on the decoded Nth second image data.

BRIEF DESCRIPTION OF THE DRAWINGS

The above and other features and advantages will become more apparent by describing in detail preferred embodiments thereof with reference to the attached drawings in which:

FIG. 6 illustrates a conceptual diagram for explaining an encoding method of a second encoder according to an embodiment;

DETAILED DESCRIPTION OF CERTAIN INVENTIVE EMBODIMENTS

Figure 1:
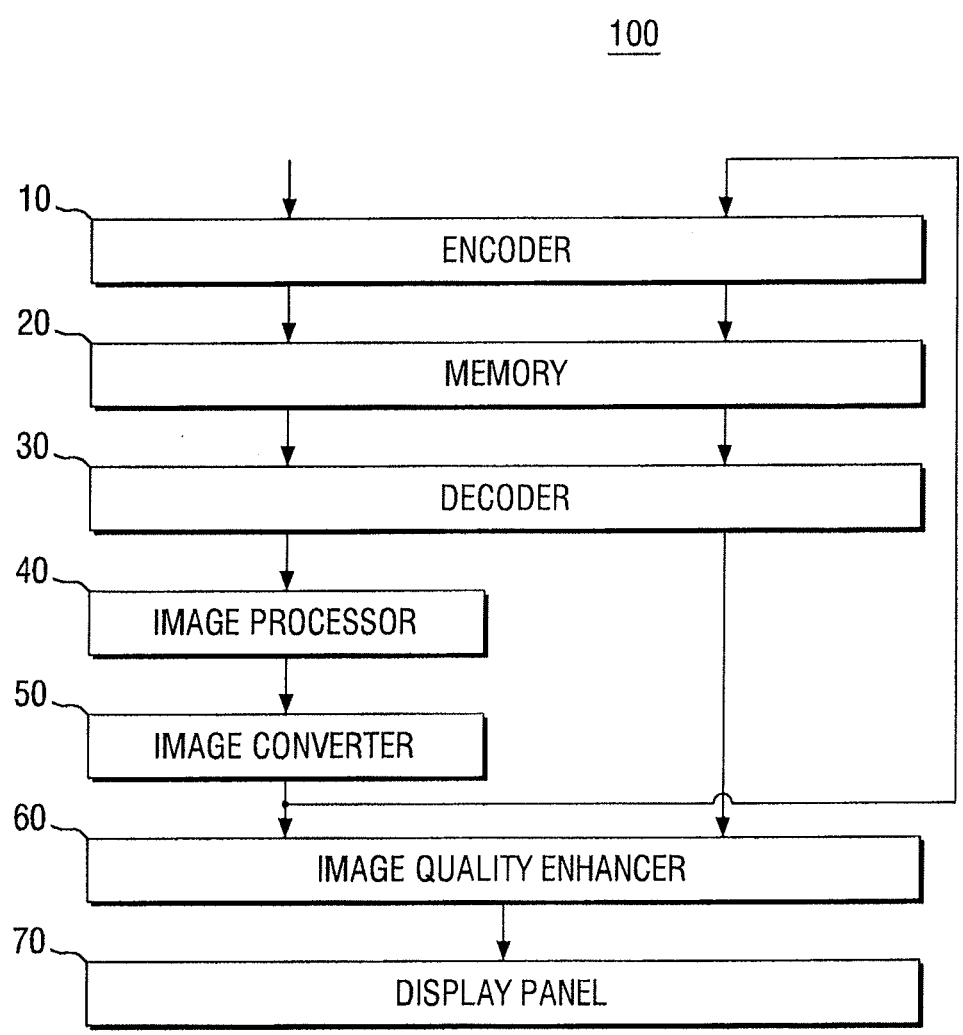
FIGS. 1 and 2 illustrate block diagrams of display apparatuses according to some embodiments.

Advantages, features, and methods may be understood more readily by reference to the following detailed description of preferred embodiments and the accompanying drawings. Hereinafter, some embodiments will be described in detail and should not be construed as being limited to the embodiments set forth herein. Rather, these embodiments are provided so that this disclosure will be thorough and complete and will fully convey the concept of the invention to those of ordinary skill in the art, and will only be defined by the appended claims. Thus, in some embodiments, well-known structures and devices are not shown in order not to obscure the description of the invention with unnecessary detail. Like numbers refer to like elements throughout. In the drawings, the thickness of layers and regions are exaggerated for clarity.

It may be understood that when an element or layer is referred to as being "on," or "connected to" another element or layer, it may be directly on or connected to the other element or layer, or intervening elements or layers may be present. In contrast, when an element is referred to as being "directly on" or "directly connected to" another element or layer, there are may be no intervening elements or layers present. As used herein, the term "and/or" may include any and all combinations of one or more of the associated listed items.

Spatially relative terms, such as "below," "beneath," "lower," "above," "upper," and the like, may be used herein for ease of description to describe one element or feature's relationship to another element(s) or feature(s) as illustrated in the figures. It may be understood that the spatially relative terms are intended to encompass different orientations of the device in use or operation, in addition to the orientation depicted in the figures.

Embodiments described herein may be described as referring to plan views and/or cross-sectional views by way of ideal schematic views. Accordingly, the exemplary views may be modified depending on manufacturing technologies and/or tolerances. Therefore, the embodiments are not limited to those shown in the views, but may include modifications in configuration formed on the basis of manufacturing processes. Therefore, regions exemplified in figures may have schematic properties, and shapes of regions shown in figures exemplify specific shapes of regions of elements and do not limit embodiments described hereinafter.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Hereinafter, certain embodiments may be described in further detail with reference to the accompanying drawings.

Figure 2:
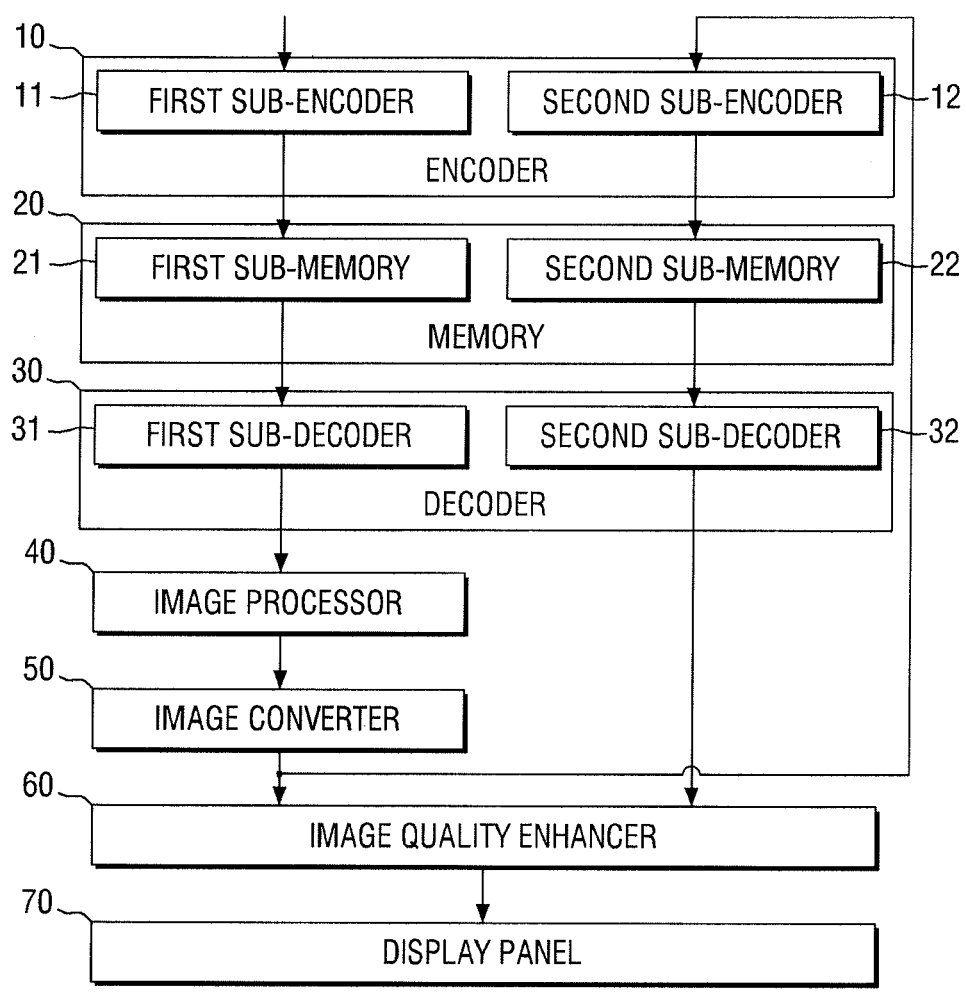

FIG. 1 and FIG. 2 are block diagrams of display apparatuses according to various embodiments.

Referring to FIG. 1, the display apparatus 100 according to one embodiment includes an encoder 10, a memory 20, a decoder 30, an image processor 40, an image converter 50, an image quality enhancer 60, and a display panel 70. Referring to FIG. 2, the encoder 10 includes a first sub-encoder (also termed first encoder) 11 and a second sub-encoder (also termed second encoder) 12. The memory 20 may include a first sub-memory (also termed first memory) 21, and a second sub-memory (also termed second memory) 22. The decoder 30 may include a first sub-decoder (also termed first decoder) 31 and a second sub-decoder (also termed second decoder) 32.

The display panel 70 is a panel that displays an image, and in some embodiments includes a liquid crystal display (LCD) panel, an electrophoretic display panel, an organic light emitting diode (OLED) panel, a light emitting diode (LED) panel, an inorganic electro luminescent (EL) panel, a field emission display (FED) panel, a surface-conduction electron-emitter display (SED) panel, a plasma display panel (PDP), or a cathode ray tube (CRT) display panel. Throughout the specification, the display panel 70 will be described with regard to an LCD panel or an OLED panel by way of example, but not limited thereto.

The display panel 70 receives Nth second image data from the image quality enhancer 60 and displays an image using the Nth second image data. The second image data and the image quality enhancer 60 will later be described.

The image converter 50 converts image data of one type into image data of another type. The image converter 50 may convert first image data into second image data. The first image data and the second image data may have different data formats, but may be used to display both a motion picture and/or a still picture.

The first image data may be RGB striped image data. In some embodiments, the first image data has a red component value corresponding to an RGB striped red pixel, a green component value corresponding to a green pixel, and a blue component value corresponding to a blue pixel. The first image data may have the respective values in a first image data matrix. In addition, the red component value, the green component value, and the blue component value of the first image data may be 8-bit values.

The second image data may be PenTile image data, and may include a second image data matrix having 2n rows and 2m columns. The second image data as PenTile image data will now be described in more detail with reference to FIG. 3.

Figure 3:
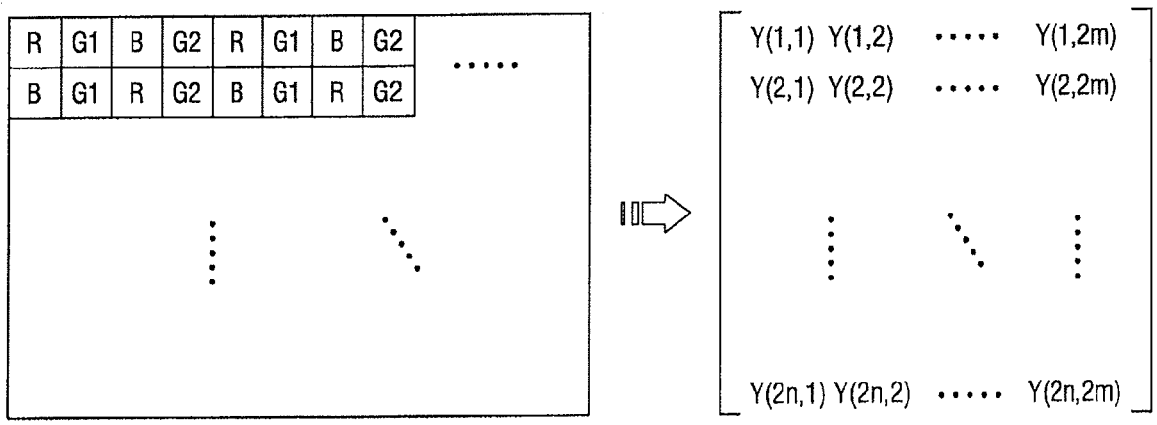
FIG. 3 illustrates a conceptual diagram for explaining a second image data matrix according to an embodiment.

FIG. 3 is a conceptual diagram illustrating a second image data matrix according to one embodiment. FIG. 3 illustrates that the display panel 70 is an OLED panel by way of example.

The second image data matrix shown in the right of FIG. 3 may include data used to implement a PenTile pixel structure shown in the left of FIG. 3. When the display panel 70 is an OLED panel, the PenTile image data of the OLED panel may include one red pixel, one blue pixel and two green pixels. Therefore, each of elements in the second image data matrix of the OLED panel may have a red component value R for one red pixel, a blue component value B for one blue pixel, and first and second green component values G1 and G2 for two green pixels. The red component value R, the blue component value B, the first green component value G1 and the second green component value G2 may each be an 8-bit value.

The elements of the second image data matrix may be indexed using row and column numbers of the elements. For example, Y(1,1) in the second image data matrix may mean an element positioned at an interconnection of the first row and the first column and Y(2n, 2m) in the second image data matrix may mean an element positioned at an interconnection of the 2n-th row and the 2m-th column.

One element of the second image data matrix may have a red component value R for a red pixel in the PenTile pixel structure shown in the left of FIG. 3, a blue component value B for a blue pixel, and first and second green component values G1 and G2 for two green pixels. In addition, the one element of the second image data matrix is located to correspond to the red pixel, the blue pixel and the green pixel of the PenTile pixel structure. For example, Y(1,1) of the second image data matrix has a red component value R of the first red pixel of the first row, a blue component value B of the first blue pixel and green component values G1 and G2 of the first two green pixels. Y(2,1) of the second image data matrix has a red component value R of the first red pixel of the second row, a blue component value B of the first blue pixel and green component values G1 and G2 of the first two green pixels, and Y(1,2) of the second image data matrix has a red component value R of the second red pixel of the first row, a blue component value B of the second blue pixel and green component values G1 and G2 of the second two green pixels. Image data values for pixels are converted into a matrix format. However, the image data values for pixels may also be converted into other types of image data formats.

As described above, the display panel 70 may be an OLED panel or an LCD panel. When the display panel 70 is an LCD panel, the LCD panel may display PenTile image data having one red pixel, one green pixel, one blue pixel and one white pixel. Therefore, each of second image data matrix in the LCD panel may have a red component value R for one red pixel, a green component value G for one green pixel, a blue component value B for one blue pixel and a white component value W for one white pixel. The red component value R, the green component value G, the blue component value B and the white component value W may be 8-bit values. Therefore, the second image data matrix of the LCD panel and the second image data matrix of the OLED panel may be implemented in substantially the same manner, except that two green pixels in the PenTile pixel structure for the OLED panel shown in FIG. 3 are replaced by one green pixel and one white pixel.

For example, when the display panel 70 is an LCD panel, Y(1,1) of the second image data matrix has a red component value R of the first red pixel of the first row, a green component value G of the first green pixel, a blue component value B of the first blue pixel and a white component value W of the first white pixel. Y(2,1) of the second image data matrix has a red component value R of the first red pixel of the second row, a green component value G of the first green pixel, a blue component value B of the first blue pixel and a white component value W of the first white pixel. Y(1,2) of the second image data matrix has a red component value R of the second red pixel of the first row, a green component value G of the second green pixel, a blue component value B of the second blue pixel and a white component value W of the second white pixel.

The image converter 50 may convert Nth first image data, where N is an integer of 2 or greater, into Nth second image data. With regard to the sequence of image data, the Nth image data may represent image data for displaying an image on the display panel 70 as image data for a present frame, the Nth first image data may represent first image data for the present frame, and the Nth second image data may represent second image data for the present frame. The (N−1)th image data may represent image data for a previous frame for an image displayed immediately before the present frame on the display panel 70. The (N−1)th first image data may represent first image data for the previous frame and the (N−1)th second image data may represent second image data for the previous frame.

The image quality enhancer 60 is provided for enhancing the image quality of a picture, such as a motion picture, displayed on the display panel 70. For example, in order to enhance image quality of a present frame, the image quality enhancer 60 may perform overdriving using image data for the previous frame. In some embodiments, when the display panel 70 is an OLED panel, the image quality enhancer 60 is a hysteresis compensation driving (HCD) unit, and when the display panel 70 is an LCD panel, the image quality enhancer 60 may be a motion image quality (MIQ) enhancer.

As described above, in order to improve image quality of the present frame, the image quality enhancer 60 may perform image quality enhancement based on image data for the previous frame. Therefore, in order to improve image quality of the Nth second image data, the (N−1)th second image data may be required. In order to meet the requirement of the (N−1)th second image data in the image quality enhancer 60, the image converter 50 may transmit the output second image data to the encoder 10 to enhance image quality of second image data for a next frame.

Hereinafter, a process for displaying Nth image data for a present frame will be described.

First, when the inputted first image data is image data from a first frame, that is, when no image data for a previous frame exists, it may not be necessary for the image quality enhancer 60 to perform image quality enhancement. Therefore, in this case, the first image data is converted into second image data without image quality enhanced by the image quality enhancer 60 and an image is displayed on the display panel 70. However, in order to enhance image quality for the second image data for the next frame, the image converter 50 may transmit the output second image data to the encoder 10. In addition, since no image data for the previous frame is required, the memory 20 may fully store the first image data for the present frame without separately encoding inputted first image data from the first frame. Therefore, the memory 20 may have enough capacity to store the image data corresponding to one frame.

When the inputted first image data is still image data for the first frame, the process is the same. Thus, a repeated description of a case where the input image data is for a still picture will not be given.

Next, when inputted first image data is image data for a frame subsequent to the first frame, the image quality enhancer 60 may perform image quality enhancement on the image data of the present frame image data using image data from the previous frame. Hereinafter, a case where the inputted first image data is image data for a frame subsequent to the first frame will be described.

The encoder 10 may receive Nth first image data and (N−1)th second image data. The Nth first image data is first image data for a present frame and (N−1)th second image data is second image data for a previous frame, which is converted from (N−1)th first image data.

The encoder 10 may encode the Nth first image data and the (N−1)th second image data at different rates. Referring to FIG. 2, the encoder 10 may include a first encoder 11 that encodes the Nth first image data at a first rate and a second encoder 12 that encodes the (N−1)th second image data at a second rate.

The encoder 10 will now be described in more detail. First, the memory 20 will be described. The memory 20 may store encoded Nth first image data and encoded (N−1)th second image data. As described above, since the memory 20 has a capacity enough to store the image data corresponding to one frame, it is not possible to store the Nth first image data corresponding to the present frame and the (N−1)th second image data corresponding to the previous frame without compression. Therefore, the memory 20 may include a first memory 21 that stores the Nth first image data and a second memory 22 that stores the (N−1)th second image data. The first memory 21 may store the encoded Nth first image data and the second memory 22 may store the encoded (N−1)th second image data. In some embodiments, the first memory 21 and the second memory 22 may have a capacity of half the overall capacity of the memory 20.

As described above, the first image data is RGB striped image data and may have a red component value corresponding to a red pixel, a green component value corresponding to a green pixel, and a blue component value corresponding to a blue pixel. The red component value, the green component value, and the blue component value may be 8-bit values. Therefore, the memory 20 may store 24-bit data and the first and second memories 21 and 22 may store 12-bit data.

The encoder 10 will further be described. The first encoder 11 may encode Nth first image data at a first rate. While the Nth first image data is 24-bit data, the first memory 21 for storing the Nth first image data may store 12-bit data. Thus, the first encoder 11 may encode the Nth first image data at a rate of 50%. The encoded Nth first image data may be stored in the first memory 21 of the memory 20 by the first encoder 11.

The second encoder 12 may encode the (N−1)th second image data at a second rate. In some embodiments, the second image data may be PenTile image data. When the display panel 70 is an OLED panel, the (N−1)th second image data may have a red component value R for one red pixel, a blue component value B for one blue pixel, and first and second green component values G1 and G2 for two green pixels. The (N−1)th second image data may be stored in small units of "RG1/BG1/RG1/BG1 . . . ." When the display panel 70 is an LCD panel, the (N−1)th second image data may have a red component value R for one red pixel, a green component value G for one green pixel, a blue component value B for one blue pixel, and a white component value W for one white pixel. The (N−1)th second image data may be stored in small units of "RG/BW/RG/BW . . . ." Therefore, the (N−1)th second image data may be inputted into the second encoder 12 in units of 16 bits, corresponding to a magnitude of two color values in small units. However, since the second memory 22 for storing (N−1)th second image data stores 12-bit data, it may encode the (N−1)th second image data at a rate of 75%. The encoded (N−1)th second image data may be stored in the second memory 22 of the memory 20 by the second encoder 12. The operation of the second encoder 12 will now be described in more detail with reference to FIG. 4.

Figure 4:
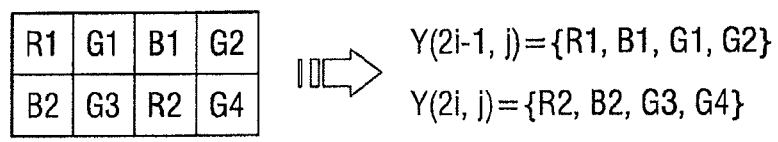
FIG. 4 illustrates a conceptual diagram for explaining a second encoder according to an embodiment.

FIG. 4 is a conceptual diagram for describing a second encoder according to an embodiment of the present invention, in which a display panel 70 is an OLED panel.

The second encoder 12 may encode the (N−1)th second image data at a first rate, and the encoding may be performed by compressing data in a second image data matrix of the (N−1)th second image data.

Referring to FIG. 4, the second encoder 12 encodes a red component value R1 of (2i−1, j) element in the second image data matrix and the red component value R2 of (2i, j) element in the second image data matrix using an encoded red component value R12, a blue component value B1 of (2i−1, j) element and a blue component value B2 of (2i, j) element in the second image data matrix using an encoded blue component value B 12, and a first green component value G3 of (2i−1, j) element and a second green component value G4 of (2i, j) element in the second image data matrix using an encoded first green component value G34. The second encoder 12 may perform encoding on elements adjacent in a row direction in the second image data matrix. Here, "i" is a positive integer of m or less, and "j" is a positive integer of 2n or less. In the second image data matrix, the red component values R1 and R2, the blue component values B1 and B2, the first green component values G1 and G3 and the second green component values G2 and G4 are 8-bit values. Thus, when encoding is performed at a rate of 75% by the second encoder 12, the encoded red component value R12, the blue component value B12, the first green component value G12, and the second green component value G34 may be 12-bit values. In some embodiments, the second encoder 12 may employ differential pulse code modulation (DPCM). The encoding method of the second encoder 12 will now be described in more detail with reference to FIGS. 5 and 6.

Figure 5:
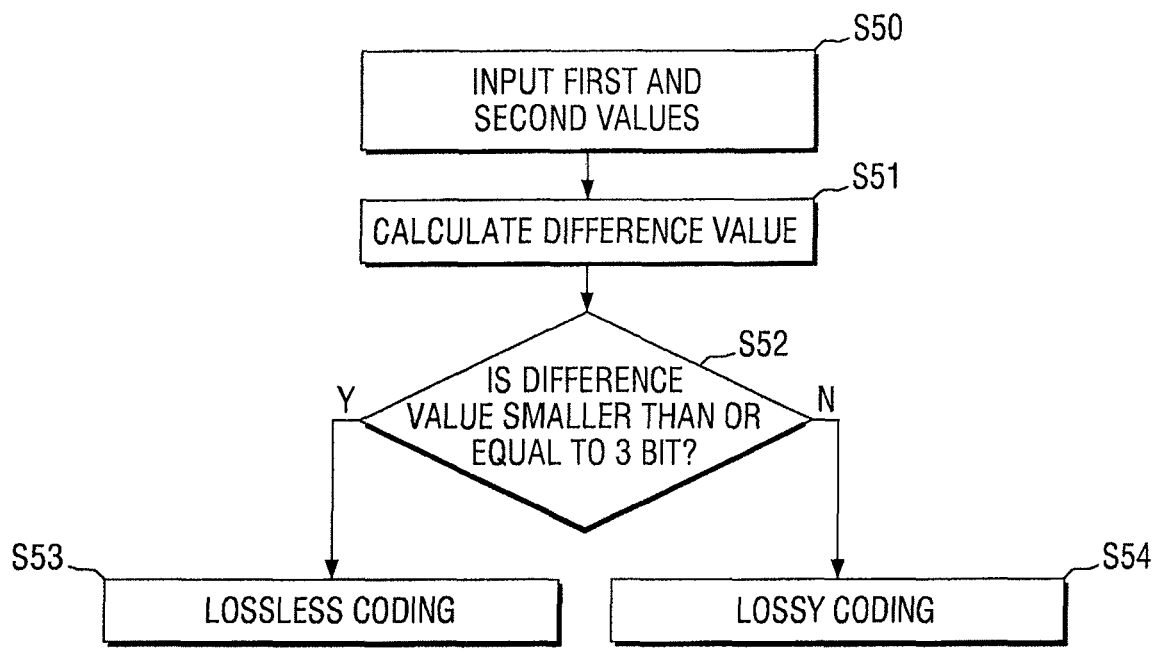
FIG. 5 illustrates a flowchart for explaining the operation of a second encoder according to an embodiment.

FIG. 5 is a flowchart for explaining the operation of a second encoder according to one embodiment, and FIG. 6 is a conceptual diagram for explaining an encoding method of a second encoder according to a second embodiment.

First, the second encoder 12 may receive a first value and a second value (S50). The first value and the second value are minimum unit values of two input values used in an actual encoding operation performed by the second encoder 12. For example, the first value and the second value may be color values (that is, a red component value, a blue component value, a first green component value, and a second green component value) of the elements of the second image data matrix, and may be data values for the same color.

The second encoder 12 may encode the (N−1)th second image data. For example, in the embodiment shown in FIG. 4, the second encoder 12 may encode (2i−1, j) and (2i, j) elements adjacent in a row direction in the second image data matrix of the (N−1)th second image data. The second encoder 12 may encode a red component value R1 of (2i−1, j) element and a red component value R2 of (2i, j) element using an encoded red component value R12. In addition, the second encoder 12 may encode a blue component value B1 of (2i−1, j) element and a blue component value B2 of (2i, j) element using an encoded blue component value B12. In addition, the second encoder 12 may encode a first green component value G1 and a second green component value G2 of (2i−1, j) element using an encoded first green component value G12. In addition, the second encoder 12 may encode a first green component value G3 and a second green component value G4 of (2i, j) element using an encoded second green component value G34. Therefore, the minimum unit values of two input values used in an actual encoding operation performed by the second encoder 12 may represent the respective color values of the elements of the second image data matrix, which will be described with reference to FIG. 4. When the first value is a red component value of R1 of element (2i−1, j), the second value is a red component value of R2 of element (2i, j). When the first value is a blue component value B1 of element (2i−1, j), the second value is a blue component value B2 of element (2i, j). When the first value is a first green component value G1 of element (2i−1, j), the second value is a second green component value G2 of element (2i−1, j). When the first value is a first green component value G3 of element (2i, j), the second value is a second green component value G4 of element (2i, j). In the following description, the first value is a red component value R1 of element (2i−1, j) and the second value is a red component value R2 of element (2i, j).

Next, the second encoder 12 may calculate a difference value between the first value and the second value (S51). Then, it is determined whether the difference value is a value of 3 bits or less (S52) to determine an appropriate encoding method. In some embodiments, the encoding method may include lossless coding and lossy coding.

When the difference value is a value of 3 bits or less, the second encoder 12 may perform lossless coding (S53). As described above, the first value, the red component value R1 of element (2i−1, j), and the second value, the red component value R2 of element (2i, j) are 8-bit values, and the second encoder 12 may perform encoding at a compression rate of 75%. Therefore, the encoded red component value R12 output from the second encoder 12, the third value, is a 12-bit value.

In the case where an 8-bit first value and a 12-bit second value are losslessly coded into a 12-bit third value, the bit allocation will now be described in further detail. The third value is a flag bit indicating whether or not to perform lossy coding, and may use the most significant bit (MSB). For example, the MSB may be set to "1" in a case of lossless coding, and to "0" in a case of lossy coding. In step S53, lossless coding is performed. Thus, the MSB of the third value may be set to "1." Next, the first value of 8 bits and the difference value of 3 bits or less between the first value and the second value may be allocated to the remaining 11 bits of the third value. Since the first value is losslessly allocated to the third value, and the difference value between the first value and the second value is also losslessly allocated, the second encoder 12 may perform lossless coding. In addition, during decoding, the second value may be losslessly decoded using the first value allocated to the third value and the difference value, which will later be described in more detail.

When the difference value between the first value and the second value is 3 bits or greater, the second encoder 12 may perform lossy coding (S54). The second encoder 12 may use only 11 bits of the third value, excluding the MSB as a flag bit, during encoding. Therefore, when the difference value is 3 bits or greater, either the first value or the second value of 8 bits is allocated to the third value. Since it is not possible to allocate all the bits of the difference value to the third value, lossy coding may be performed in this case.

The bit allocation in the case where the first and second values of 8 bits are losslessly coded into a 12-bit third value will now be described in more detail. The MSB may be set to "0" indicating lossy coding. Next, the upper 6 bits of the first value and the upper 5 bits of the second value may be allocated to the third value. In some embodiments, the upper 5 bits of the first value and the upper 6 bits of the second value may also be allocated to the third value. When the difference value is a value of 3 bits or greater, it is not possible to perform lossless coding. Therefore, lower bits of the first value and the second value are abandoned and only upper bits may be allocated to the third value. During decoding, the upper bits of the first and second values may be used, which will later be described in more detail.

Referring back to FIG. 4, the second encoder 12 may encode a red component value, a blue component value, a first green component value, and a second green component value for each element by the above-described method using the first value and the second value shown in FIG. 5 and FIG. 6.

In order to perform image quality enhancement using PenTile image data and which requires image data from a previous frame, additional memory 20 may further be required since data sizes of Nth first image data and (N−1)th second image data are different from one another. In one embodiment, the display apparatus 100, a compression rate different from that of the first image data, which may be RGB striped image data, may be applied to the second image data, which may be PenTile image data, thereby allowing an image quality enhancer, e.g., an HCD enhancer, to be compatibly used with the HCD without requiring additional memory.

Figure 7:
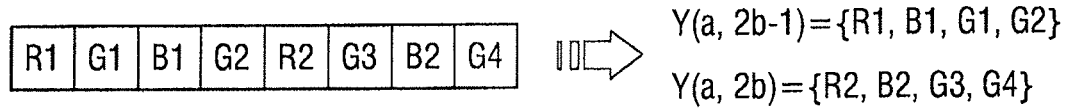
FIGS. 7 to 9 illustrate conceptual diagrams for explaining encoding methods of second encoders according to some embodiments.
Figure 9:
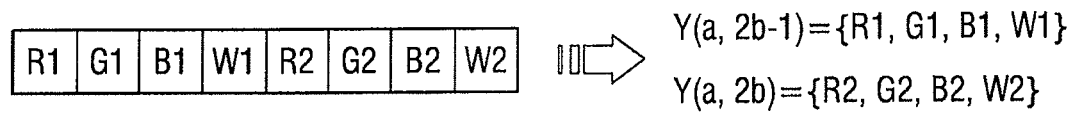

FIG. 7 and FIG. 9 are conceptual diagrams for explaining encoding methods of second encoders, in which a display panel 70 is an OLED panel.

Referring to FIG. 7, the second encoder 12 may encode a red component value R1 of element (a, 2b−1) in a second image data matrix, and a component value R2 of element (a, 2b) in the second image data matrix using an encoded red component value R12, a blue component value B1 of element (a, 2b−1) in the second image data matrix, and a blue component value B1 of element (a, 2b) in the second image data matrix using an encoded blue component value B12, first and second green component values G1 and G2 of element (a, 2b−1) in the second image data matrix using an encoded first green component value G12, and first and second green component values G3 and G4 of element (a, 2b) in the second image data matrix using an encoded second green component value G34. The second encoder 12 may perform encoding on elements adjacent in a row direction in the second image data matrix. Here, "a" is a positive integer of 2m or less, and "b" is a positive integer of n or less.

The display panel 70 may receive data in a column direction in the second image data matrix and displays an image. The display panel 70 displays an image using the second image data. The data may be input in the column direction in the second image data matrix according to the scanning direction of the display. Therefore, when the second encoder 12 performs encoding on values adjacent in the same direction as a data input direction for the display panel 70, an additional line buffer memory may not be required.

The operation of the second encoder shown in FIG. 7 is essentially the same as that of the second encoder shown in FIG. 4 to FIG. 6, except that the second encoder shown in FIG. 7 performs encoding on elements adjacent in a column direction in the second image data matrix, and a repeated explanation thereof will be omitted.

Figure 8:
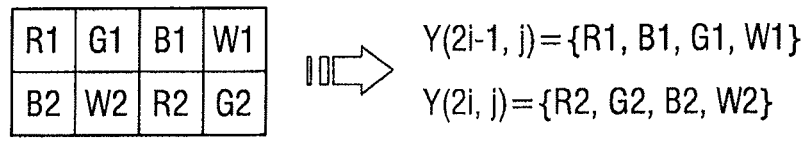

In FIG. 8 and FIG. 9, a display panel 70 is an LCD panel. As described above, when the display panel 70 is an LCD panel, the LCD panel may display PenTile image data having one red pixel, one green pixel, one blue pixel and one white pixel. In the LCD panel, each of elements of the second image data matrix may have a red component value R for one red pixel, a green component value G for one green pixel, a blue component value B for one blue pixel, and a white component value W for one white pixel. In addition, the red component value R, the green component value G, the blue component value B and the white component value W may be 8-bit values.

Referring to FIG. 8, the second encoder 12 may encode a red component value R1 of element (2i−1, j) in a second image data matrix and a red component value R2 of element (2i, j) in the second image data matrix using an encoded red component value R12. In addition, the second encoder 12 may encode a blue component value B1 of element (2i−1, j) in the second image data matrix, and a blue component value B2 of element (2i, j) in the second image data matrix using an encoded blue component value B12. In addition, the second encoder 12 may encode a green component value G1 of element (2i−1, j) in the second image data matrix and a green component value G2 of element (2i−1, j) in the second image data matrix using an encoded green component value G12. In addition, the second encoder 12 may encode a white component value W1 of element (2i−1, j) in the second image data matrix and a white component value W2 of element (2i, j) in the second image data matrix using an encoded white component value W12. The second encoder 12 may perform encoding on elements adjacent in a row direction in the second image data matrix. Here, "i" is a positive integer of m or less and "j" is a positive integer of 2n or less.

The operation of the second encoder shown in FIG. 8 is essentially the same as that of the second encoder shown in FIG. 4 to FIG. 6, except that the lay panel 70 is an LCD panel and the second image data has one green component value, rather than two green component values, and one white component value so a repeated explanation will be omitted.

Referring to FIG. 9, a second encoder 12 may encode a red component value R1 of element (a, 2b−1) in a second image data matrix and a red component value R2 of element (a, 2b) in the second image data matrix using an encoded red component value R12. In addition, the second encoder 12 may encode a blue component value B1 of element (a, 2b−1) in the second image data matrix, and a blue component value B2 of element (a, 2b) in the second image data matrix using an encoded blue component value B12. In addition, the second encoder 12 may encode a green component value G1 of element (a, 2b−1) in the second image data matrix, and a green component value G2 of element (a, 2b) in the second image data matrix using an encoded green component value G12. In addition, the second encoder 12 may encode a white component value W1 of element (a, 2b−1) in the second image data matrix and a white component value W2 of element (a, 2b) in the second image data matrix using an encoded white component value W12. The second encoder 12 may perform encoding on elements adjacent in a column direction in the second image data matrix. Here, "a" is a positive integer of 2m or less and "b" is a positive integer of n or less.

The operation of the second encoder shown in FIG. 9 is essentially the same as that of the second encoder shown in FIG. 7, except that the display panel 70 is an LCD panel and the second image data has one green component value, rather than two green component values, and one white component value so a repeated explanation will be omitted.

Referring back to FIG. 1 and FIG. 2, the memory 20 may serve as a buffer that temporarily stores the encoded Nth first image data and the encoded (N−1)th second image data, which are transmitted to the decoder 30.

The decoder 30 may decode the encoded Nth first image data, and the encoded (N−1)th second image data, which may have been received from the memory 20. Referring to FIG. 2, the decoder 30 may include a first decoder 31 that decodes the encoded Nth first image data and a second decoder 32 that decodes the encoded (N−1)th second image data.

The decoder 30 may perform a decoding operation for restoring image data in a reverse direction to the encoding operation performed by the encoder 10. The first decoder 31 may perform a decoding operation in a reverse direction to the encoding operation performed by the first encoder 11, and the second decoder 32 may perform a decoding operation in a reverse direction to the encoding operation performed by the second encoder 12.

The second decoder 32 may determine a decoding method based on the MSB of a third value corresponding to the image data encoded by the second encoder 12. As described above, the MSB of the third value is a flag bit indicating whether the encoding method is a lossless coding or a lossy coding. Therefore, when the MSB of the third value indicates that the encoding method is a lossless coding, the second decoder 32 may decode a first value using 8 bits of the first value allocated to the third value, and may decode a second value using the 8-bit first value allocated to the third value and a 3-bit difference value. In addition, when the MSB of the third value indicates that the encoding method is a lossy coding, the second decoder 32 may decode a first value using upper 6 bits of the first value allocated to the third value, and may decode a second value using upper 5 bits of the second value allocated to the third value.

The image processor 40 may receive the decoded Nth first image data from the decoder 30 and may perform color processing. The color processing may include a process of enhancing quality of image data. The image processor 40 may receive the decoded Nth first image data to improve display characteristics, including hue, lightness, color temperature, clarity and so on.

The image processor 40 and the image quality enhancer 60 are both used to enhance quality of image data. However, the image quality enhancer 60 uses image data for a previous frame to enhance image quality of a present frame, while the image processor 40 uses image data for another present frame to enhance the image quality of a present frame.

The image converter 50 may convert the Nth first image data received from the image processor into Nth second image data. As described above, the image converter 50 may convert one type image data into another type image data. For example, the image converter 50 may convert RGB striped first image data into PenTile second image data. In addition, in order to enhance image quality for image data for the next frame, that is, (N+1)th first image data, the image converter 50 may transmit the Nth second image data to the encoder 10.

The image quality enhancer 60 may receive decoded (N−1)th second image data from the decoder 30, and may receive the Nth second image data from the image converter 50. As described above, the image quality enhancer 60 may use the (N−1)th second image data from image data for a present frame in order to perform image quality enhancement on the Nth second image data to be displayed on the display panel 70. In some embodiments, when the display panel 70 is an OLED panel, the image quality enhancer 60 may be a hysteresis compensation driving (HCD) unit. When the display panel 70 is an LCD panel, the image quality enhancer 60 may be a motion image quality (MIQ) enhancer.

The display panel 70 may receive the Nth second image data whose image quality is enhanced by the image quality enhancer 60 to display an image.

In a case where the image converter 50 is positioned in the rear of the image quality enhancer 60, that is, in a case where such image quality enhancement as HCD or MIQ is employed to the first image data, and the RGB striped first image data has undergone image quality enhancement into PenTile second image data, compensation parameters of image quality such as HCD or MIQ may be damaged by a rendering algorithm of the image converter 50. The rendering algorithm of the image converter 50 generally includes operations of data for adjacent pixels, such as multiplying data for one pixel, and data of pixels around the one pixel by a predetermined coefficient. Therefore, overshoot or undershoot parameters determined by an image quality compensation table of HCD or MIQ may be damaged by the rendering algorithm of the image converter 50.

According to one embodiment, the image converter 50 located in the display apparatus 100, for converting the first image data into the second image data is arranged frontward. The image quality enhancer 60 for performing image quality enhancement such as HCD or MIQ on the converted second image data is arranged backward, thereby maintaining the image quality compensation effect of the image quality enhancer 60.

Figure 10:
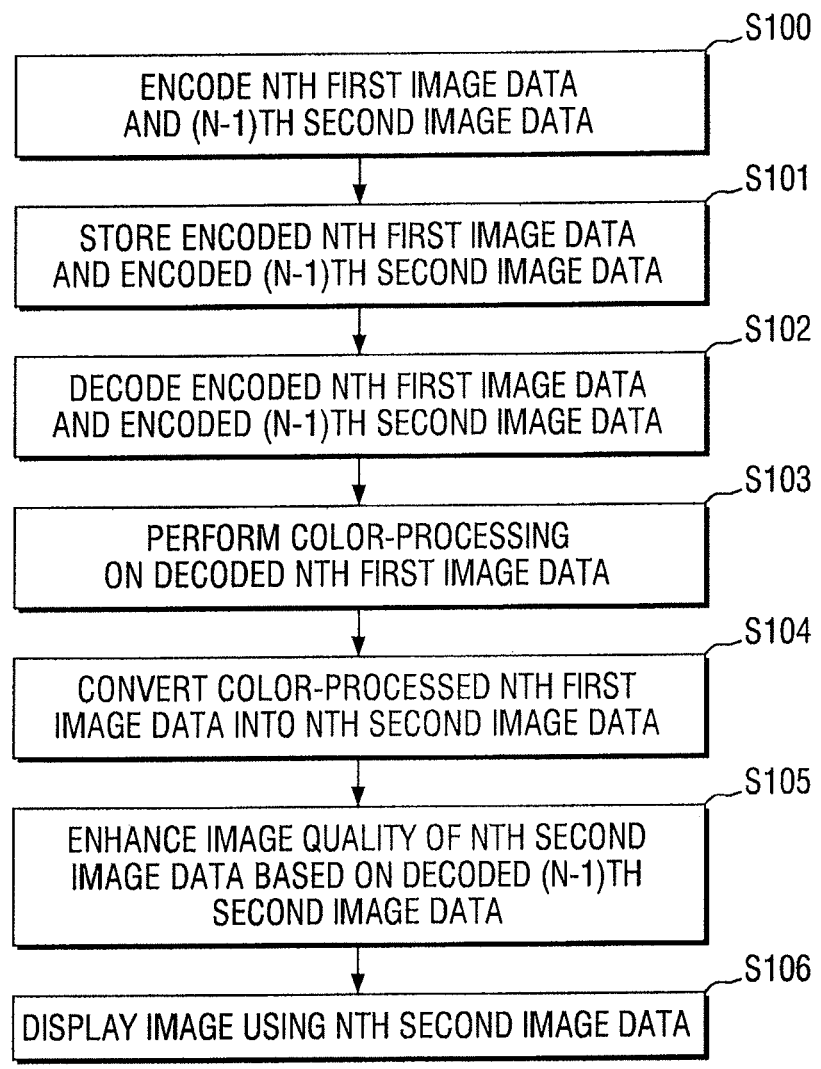
FIG. 10 illustrates a flowchart for explaining a driving method of a display apparatus according to an embodiment.

FIG. 10 is a flowchart for explaining a driving method of a display apparatus according to an embodiment of the present invention.

First, Nth first image data and (N−1)th second image data may be encoded at different rates (S 100). The encoding may include encoding Nth first image data at a first rate, and encoding (N−1)th second image data at a second rate. Here, the first rate may be 50% and the second rate may be 75%. The encoding is essentially the same as the encoding as shown in FIG. 1 to FIG. 9, and a repeated description will be omitted.

The first image data may include a red component value, a green component value, and a blue component value. The second image data may include a second image data matrix having 2n rows and 2m columns. When the display panel is an OLED panel, each of elements of the second image data matrix has a red component value, a blue component value, a first green component value and a second green component value. When the display panel is an LCD panel, each of elements of the second image data matrix has a red component value, a blue component value, a green component value and a white component value. The first image data and the second image data are substantially the same as those shown in FIG. 1 to FIG. 9, and a repeated description will be omitted.

The encoding may include encoding a first value of 8 bits and a second value of 8 bits into a third value of 12 bits. When the difference between the two values is 3 bits or less, the encoding of the first and second values into the third value may include setting the most significant bit (MSB) of the third value to 1, allocating the first value to the third value, and allocating the difference value to 3 bits of the third value.

When the difference is a value of 3 bits or greater, the encoding of the first and second values into the third value may include setting the most significant bit (MSB) of the third value to 0, allocating upper 6 bits of the first value to the third value, and allocating upper 5 bits of the second value to the third value. In some embodiments, the encoding of the first and second values into the third value may include encoding image data including a red component value, blue component value, a first green component value, and a second green component value. The first value and the second value may be one selected from a red component value, a blue component value, a first green component value and a second green component value. The encoding of the first value and the second value is essentially the same as the encoding shown in FIG. 1 to FIG. 9, and a repeated description will be omitted.

Next, the encoded Nth first image data and the encoded (N−1)th second image data may be stored in a memory (S101). The storing of the encoded image data is essentially the same as the storing shown in FIG. 1 to FIG. 9, and a repeated description will be omitted.

Next, the encoded Nth first image data and the encoded (N−1)th second image data, received from the memory, may be decoded (S102). The decoding is essentially the same as the decoding shown in FIG. 1 to FIG. 9, and a repeated description will be omitted.

Next, color processing is performed on the decoded Nth first image data (S103). The performing of the color processing on the decoded image data is essentially the same as the performing of the color processing shown in FIG. 1 to FIG. 9, and a repeated description will be omitted.

Next, the color-processed Nth first image data is converted into Nth second image data (S 104). The converting of the color-processed first image data into the second image data is essentially the same as the converting shown in FIG. 1 to FIG. 9, and a repeated description will be omitted.

Next, image quality of the Nth second image data is enhanced based on the decoded (N−1)th second image data (S105). The enhancing of the image quality of the Nth second image data is essentially the same as the enhancing shown in FIG. 1 to FIG. 9, and a repeated description will be omitted.

Next, an image is displayed using the Nth second image data whose image quality is enhanced (S106). The displaying of the image is essentially the same as the displaying shown in FIG. 1 to FIG. 9, and a repeated description will be omitted.

In addition to the embodiments presented, it will be understood by those of ordinary skill in the art that various changes in form and details may be made therein without departing from the spirit and scope of the embodiments as defined by the following claims. It is therefore desired that the present embodiments be considered in all respects as illustrative and not restrictive, with reference being made to the appended claims rather than the foregoing description to indicate the scope of the invention.

As described above, according to some embodiments a display apparatus, may enhance image quality based on image data from a previous frame by converting RGB striped image data into PenTile image data, and a driving method thereof.

Some embodiments may also provide a display apparatus which employs architectures associated with color processing for image improvement and image quality enhancement based on PenTile blocks and previous frame data, and a driving method thereof.

Additional embodiments may also provide a display apparatus, which employs an image data compression method compatibly used when both PenTile image data and previous frame data are applied to image quality enhancement, and a driving method thereof.

In addition, as described above, there may be provided a display apparatus including an encoder that encodes Nth first image data, where N is an integer of 2 and greater and (N−1)th second image data at different rates, a memory that stores the encoded Nth first image data and the encoded (N−1)th second image data, a decoder that decodes the encoded Nth first image data and the encoded (N−1)th second image data received from the memory, an image processor that performs color processing on the decoded Nth first image data, an image converter that converts the Nth first image data received from the image processor into Nth second image data, an image quality enhancer that enhances image quality of the Nth second image data based on the decoded (N−1)th second image data, and a display panel that displays an image using the Nth second image data from the image quality enhancer.

There may be a driving method of a display apparatus, the driving method including encoding Nth first image data, where N is an integer of 2 and greater and (N−1)th second image data at different rates, storing the encoded Nth first image data and the encoded (N−1)th second image data in a memory, decoding the encoded Nth first image data and the encoded (N−1)th second image data received from the memory, performing color processing on the decoded Nth first image data, converting the Nth first image data into Nth second image data, enhancing image quality of the Nth second image data based on the decoded (N−1)th second image data, and displaying an image using the Nth second image data whose image quality is enhanced.

The display apparatus and the driving may convert RGB striped image data into PenTile image data, and image quality enhancement may be performed based on the previous frame data which may be employed together.

In addition, as described above, in the display apparatus and the driving method, color processing for image improvement, PenTile blocks and architectures associated with image quality enhancement based on data of previous frames may also be employed.

In addition, in the display apparatus and the driving method, an image data compression method may be compatibly used when both PenTile image data and previous frame data are applied to image quality enhancement.

What is claimed is:

1. A display apparatus comprising:
an encoder that encodes Nth first image data and (N−1)th second image data at different rates, where N is an integer of 2 and greater;
a memory that stores the encoded Nth first image data and the encoded (N−1)th second image data;
a decoder that decodes the encoded Nth first image data and the encoded (N−1)th second image data received from the memory;
an image processor that performs color processing on the decoded Nth first image data;
an image converter that converts the Nth first image data received from the image processor into Nth second image data;
an image quality enhancer that enhances image quality of the Nth second image data based on the decoded (N−1)th second image data; and
a display panel that displays an image using the Nth second image data from the image quality enhancer.

2. The display apparatus of claim 1, wherein
the encoder includes a first encoder that encodes the Nth first image data at a first rate and a second encoder that encodes the (N−1)th second image data at a second rate, and
the decoder includes a first decoder that decodes the encoded Nth first image data and a second decoder that decodes the encoded (N−1)th second image data.

3. The display apparatus of claim 2, wherein the first rate is 50% and the second rate is 75%.

4. The display apparatus of claim 2, wherein
the display panel is an organic light emitting diode (OLED) panel,
the first image data includes a first image data matrix having a red component value, a green component value and a blue component value,
the second image data includes a second image data matrix having 2n rows and 2m columns, and
each of elements of the second image data matrix has a red component value, a blue component value, a first green component value and a second green component value, where n and m are independently integer of 1 or greater.

5. The display apparatus of claim 4, wherein the second encoder encodes a red component value of (a, 2b−1) element in the second image data matrix and the red component value of (a, 2b) element in the second image data matrix using an encoded red component value, a blue component value of (a, 2b−1) element in the second image data matrix and the blue component value of (a, 2b) element in the second image data matrix using an encoded blue component value, a first green component value of (a, 2b−1) element in the second image data matrix and the first green component value of (a, 2b) element in the second image data matrix using an encoded first green component value, and a second green component value of (a, 2b−1) element in the second image data matrix and the second green component value of (a, 2b) element in the second image data matrix using an encoded second green component value, where a is a positive integer of 2m or less and b is a positive integer of n or less.

6. The display apparatus of claim 5, wherein in the second image data matrix,
the red component value, the blue component value, the first green component value and the second green component value are 8-bit values, respectively, and
the encoded red component value, the encoded blue component value, the encoded first green component value and the encoded second green component value are 12-bit values, respectively.

7. The display apparatus of claim 5, wherein the display panel receives data in a column direction of the second image data matrix and displays the image.

8. The display apparatus of claim 4, wherein the second encoder encodes a red component value of (2i−1, j) element in the second image data matrix and the red component value of (2i, j) element in the second image data matrix using an encoded red component value, a blue component value of (2i−1, j) element in the second image data matrix and the blue component value of (2i, j) element in the second image data matrix using an encoded blue component value, a first green component value of (2i−1, j) element in the second image data matrix and the first green component value of (2i, j) element in the second image data matrix using an encoded first green component value, and a second green component value of (2i−1, j) element in the second image data matrix and the second green component value of (2i, j) element in the second image data matrix using an encoded second green component value, where i is a positive integer of m or less and j is a positive integer of 2n or less.

9. The display apparatus of claim 4, wherein the image quality enhancer is a hysteresis compensation driving (HCD) unit.

10. The display apparatus of claim 2, wherein the display panel is a liquid crystal display (LCD) panel,
the first image data includes a first image data matrix having a red component value, a green component value and a blue component value,
the second image data includes a second image data matrix having 2n rows and 2m columns, and
each of elements of the second image data matrix has a red component value, a blue component value, a green component value and a white component value.

11. The display apparatus of claim 10, wherein the second encoder encodes a red component value of (a, 2b−1) element in the second image data matrix and the red component value of (a, 2b) element in the second image data matrix using an encoded red component value, a blue component value of (a, 2b−1) element in the second image data matrix and the blue component value of (a, 2b) element in the second image data matrix using an encoded blue component value, a green component value of (a, 2b−1) element in the second image data matrix and the green component value of (a, 2b) element in the second image data matrix using an encoded green component value, and a white component value of (a, 2b−1) element in the second image data matrix and the white component value of (a, 2b) element in the second image data matrix using an encoded white component value, where a is a positive integer of 2m or less and b is a positive integer of n or less.

12. The display apparatus of claim 10, wherein the image quality enhancer is a motion image quality (MIQ) enhancer.

13. The display apparatus of claim 2, wherein
the second encoder encodes an 8-bit first value and an 8-bit second value into a 12-bit third value and determines an encoding method according to a difference value between the first value and the second value, and
the first value and the second value are data values for the same color.

14. The display apparatus of claim 13, wherein when the difference value is a value of 3 bits or less, the second encoder sets the most significant bit (MSB) of the third value to 1, allocates the first value to the third value and allocates the difference value to 3 bits of the third value.

15. The display apparatus of claim 13, wherein when the difference value is a value of 3 bits or greater, the second encoder sets the MSB of the third value to 0, allocates upper 6 bits of the first value to the third value and allocates upper 5 bits of the second value to the third value.

16. The display apparatus of claim 13, wherein the second decoder determines a decoding method based on the MSB of the third value.

17. A driving method of a display apparatus, the driving method comprising:
   encoding Nth first image data and (N−1)th second image data at different rates, where N is an integer of 2 and greater;
   storing the encoded Nth first image data and the encoded (N−1)th second image data in a memory;
   decoding the encoded Nth first image data and the encoded (N−1)th second image data received from the memory;
   performing color processing on the decoded Nth first image data;
   converting the Nth first image data into Nth second image data;
   enhancing image quality of the Nth second image data based on the decoded (N−1)th second image data; and
   displaying an image using the Nth second image data whose image quality is enhanced.

18. The driving method of claim 17, wherein the encoding comprises encoding the Nth first image data at a first rate and encoding the (N−1)th second image data at a second rate.

19. The driving method of claim 18, wherein the first rate is 50% and the second rate is 75%.

20. The driving method of claim 18, wherein
   the first image data has a red component value, a green component value and a blue component value,
   the second image data includes a second image data matrix having 2n rows and 2m columns, and
   each of elements in the second image data matrix has a red component value, a blue component value, a first green component value and a second green component value, wherein n and m are independently integer of 1 or greater.

21. The driving method of claim 20, wherein the encoding of the second image data comprises:
   encoding a red component value of (a, 2b−1) element in the second image data matrix and the red component value of (a, 2b) element in the second image data matrix using an encoded red component value;
   encoding a blue component value of (a, 2b−1) element in the second image data matrix and the blue component value of (a, 2b) element in the second image data matrix using an encoded blue component value;
   encoding a first green component value of (a, 2b−1) element in the second image data matrix and the first green component value of (a, 2b) element in the second image data matrix using an encoded first green component value; and
   encoding a second green component value of (a, 2b−1) element in the second image data matrix and the second green component value of (a, 2b) element in the second image data matrix using an encoded second green component value, where a is a positive integer of 2m or less and b is a positive integer of n or less.

22. The driving method of claim 21, wherein the displaying of the image comprises receiving data in a column direction of the second image data matrix and displaying the image.

23. The driving method of claim 20, wherein the enhancing of the image quality comprises performing hysteresis compensation driving (HCD).

24. A driving method of a display apparatus, the driving method comprising:
   encoding an 8-bit first value and an 8-bit second value into a 12-bit third value, wherein, when the difference value is a value of 3 bits or less, a second encoder sets the most significant bit (MSB) of the third value to 1, allocates the first value to the third value and allocates the difference value to 3 bits of the third value, and when the difference value is a value of 3 bits or greater, the second encoder sets the MSB of the third value to 0, allocates upper 6 bits of the first value to the third value and allocates upper 5 bits of the second value to the third value;
   decoding the encoded 12-bit third value; and
   displaying an image based on the decoded 12-bit third value.

25. The driving method of claim 24, wherein the encoding comprises encoding image data having a red component value, a blue component value, a first green component value and a second green component value, and each of the first value and the second value is one selected from the red component value, the blue component value, the first green component value and the second green component value.

* * * * *